(12) United States Patent
Birkeland et al.

(10) Patent No.: US 10,906,715 B2
(45) Date of Patent: Feb. 2, 2021

(54) CONTAINERS FOR CARD SLOTS

(71) Applicant: Oil Vault LLC, Mountain Green, UT (US)

(72) Inventors: Lars Birkeland, Mountain Green, UT (US); Kera Birkeland, Mountain Green, UT (US)

(*) Notice: Subject to any disclaimer, the term of this patent is extended or adjusted under 35 U.S.C. 154(b) by 567 days.

(21) Appl. No.: 15/374,601

(22) Filed: Dec. 9, 2016

(65) Prior Publication Data

US 2017/0166376 A1 Jun. 15, 2017

Related U.S. Application Data

(60) Provisional application No. 62/265,772, filed on Dec. 10, 2015.

(51) Int. Cl.
*B65D 75/30* (2006.01)
*B65D 65/40* (2006.01)
(Continued)

(52) U.S. Cl.
CPC ........... *B65D 75/30* (2013.01); *A01M 31/008* (2013.01); *A61J 1/10* (2013.01); *A61J 1/1468* (2015.05); *A61J 1/16* (2013.01); *A61J 1/2024* (2015.05); *A61J 1/2027* (2015.05); *A61J 1/2093* (2013.01); *A61J 7/0046* (2013.01); *B32B 1/00* (2013.01); *B32B 7/04* (2013.01); *B32B 7/14* (2013.01); *B32B 15/08* (2013.01); *B32B 15/082* (2013.01); *B32B 15/085* (2013.01); *B32B 15/088* (2013.01); *B32B 15/09* (2013.01);
(Continued)

(58) Field of Classification Search
CPC ....... A61J 1/12; B65D 75/28; B65D 75/5811; B65D 75/5822; B65D 77/06; B65D 75/54
See application file for complete search history.

(56) References Cited

U.S. PATENT DOCUMENTS 2,876,602 A * 3/1959 Ditlea .................... B65D 75/30
53/469
6,076,661 A * 6/2000 Abadi ..................... A61F 6/005
206/37

(Continued)

FOREIGN PATENT DOCUMENTS

FR 2975977 * 12/2012
JP 4852822 * 1/2012

OTHER PUBLICATIONS

Norio, JP4852822 Machine translation (Year: 2012).*
Olive Oil: Source for Single-Serving Pouches https://backpackinglight.conn/forums/topic/14593/ (Year: 2008).*

*Primary Examiner* — Erik Kashnikow
*Assistant Examiner* — Lela S. Williams
(74) *Attorney, Agent, or Firm* — Miller IP Law, LLC (57) ABSTRACT

An example of a packet for a card slot. The container may include a chamber for storing oil. The packet may have a shape and a thickness to fit within a slot that holds a credit card. The packet may include a first lamina and a second lamina. The second lamina maybe affixed to the first lamina to form the chamber within a sealed region along a first peripheral region of the first lamina and a second peripheral region of the second lamina. A combined thickness of the first lamina, the second lamina, and the oil fits within a defined volume. A first surface of the first lamina and a second surface of the second lamina is substantially flat.

13 Claims, 10 Drawing Sheets

(51) Int. Cl.
    B65D 75/58      (2006.01)
    B65D 85/72      (2006.01)
    A61J 1/14       (2006.01)
    A01M 31/00      (2006.01)
    B32B 15/09      (2006.01)
    B32B 27/32      (2006.01)
    B65D 81/32      (2006.01)
    B32B 15/08      (2006.01)
    B32B 15/082     (2006.01)
    B32B 27/30      (2006.01)
    A61J 7/00       (2006.01)
    A61J 1/16       (2006.01)
    B32B 21/04      (2006.01)
    B32B 21/14      (2006.01)
    B32B 27/34      (2006.01)
    B32B 15/10      (2006.01)
    B32B 15/18      (2006.01)
    B32B 27/28      (2006.01)
    B32B 1/00       (2006.01)
    A61J 1/20       (2006.01)
    B65D 75/52      (2006.01)
    B32B 27/06      (2006.01)
    B32B 21/13      (2006.01)
    B32B 7/04       (2019.01)
    B32B 15/088     (2006.01)
    B32B 7/14       (2006.01)
    B32B 27/08      (2006.01)
    B32B 15/085     (2006.01)
    A61J 1/10       (2006.01)
    B32B 27/36      (2006.01)
    B32B 21/08      (2006.01)

(52) U.S. Cl.
    CPC .............. *B32B 15/10* (2013.01); *B32B 15/18*
    (2013.01); *B32B 21/04* (2013.01); *B32B 21/08*
    (2013.01); *B32B 21/13* (2013.01); *B32B 21/14*
    (2013.01); *B32B 27/06* (2013.01); *B32B 27/08*
    (2013.01); *B32B 27/281* (2013.01); *B32B
    27/308* (2013.01); *B32B 27/32* (2013.01);
    *B32B 27/34* (2013.01); *B32B 27/36* (2013.01);
    *B32B 27/365* (2013.01); *B65D 65/40*
    (2013.01); *B65D 75/527* (2013.01); *B65D
    75/5805* (2013.01); *B65D 75/5816* (2013.01);
    *B65D 81/3266* (2013.01); *B65D 85/72*
    (2013.01); *A61J 2205/30* (2013.01); *B32B
    2250/24* (2013.01); *B32B 2307/208* (2013.01);
    *B32B 2307/304* (2013.01); *B32B 2307/31*
    (2013.01); *B32B 2307/40* (2013.01); *B32B
    2307/50* (2013.01); *B32B 2307/518* (2013.01);
    *B32B 2307/54* (2013.01); *B32B 2307/542*
    (2013.01); *B32B 2307/546* (2013.01); *B32B
    2307/56* (2013.01); *B32B 2307/582* (2013.01);
    *B32B 2307/71* (2013.01); *B32B 2307/714*
    (2013.01); *B32B 2307/7163* (2013.01); *B32B
    2307/7242* (2013.01); *B32B 2307/7246*
    (2013.01); *B32B 2307/7248* (2013.01); *B32B
    2307/7265* (2013.01); *B32B 2307/732*
    (2013.01); *B32B 2307/75* (2013.01); *B32B
    2439/40* (2013.01); *B32B 2439/46* (2013.01);
    *B65D 2221/00* (2013.01)

(56) References Cited

U.S. PATENT DOCUMENTS

2014/0262904 A1* 9/2014 Young ................... B65D 75/28
                                                        206/459.5
2014/0332419 A1* 11/2014 Gaines ................... A61F 6/005
                                                        206/69

* cited by examiner

CONTAINERS FOR CARD SLOTS

RELATED APPLICATIONS

This application claims the benefit of U.S. Provisional Application No. 62/265,772, filed Dec. 10, 2015, the entire contents of which are incorporated by this reference.

BACKGROUND

With the ever-increasing access to travel comes a growing need for containers for carrying items to be mobile and convenient. In some cases, it may be desirable to carry liquid for personal grooming, religious reasons, hunting, cooking, and so forth. Bottles or bags that carry liquid and have removable caps to provide access to the liquids inside the containers may leak or be inconvenient to carry.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference may be made to the exemplary embodiments illustrated, and specific language may be used herein to describe the same. It is nevertheless to be understood that no limitation of the scope of the invention is thereby intended.

DETAILED DESCRIPTION

It is often desirable to carry contents such as oils, lotions, lubricants, scents, medications, supplements, and other items on your person or close at hand. The difficulty arises when the containers for those contents are not conducive to carrying them on your person. For example, a religious person may carry oil to perform blessings or a hunter may carry animal scents to mask his or her smell.

An individual carrying around fluids on a regular basis in cylindrical containers, semi-spherical containers, or otherwise bulky containers may be inconvenient, as the containers may not fit in a pocket, wallet, or purse. The bulky containers are not compatible with many conventional options for keeping contents in clothing or otherwise close at hand. The size and shape of these containers may be cumbersome and inefficient. Additionally, as the containers may not be compatible with many conventional options for keeping contents in clothing, the incompatibility may decrease a durability of the containers.

The embodiments described herein may address the above-noted deficiencies by providing a container (also referred to as a pouch, a bag, a container, a packet, or a housing) to carry contents. In one example, the container has a slim laminar profile for ease of carrying contents in a pocket, wallet, purse, backpack, and so forth.

The container may include an internal compartment (also referred to as a compartment, a chamber, or a cavity) formed by joining or affixing the edges or peripheral regions of two or more laminas. A lamina may be a relatively thin layer or sheet of material. The compartment may be accessed by tearing at least a portion of one or both of the laminas or otherwise separating the laminas to open a portion of the compartment.

Figure 1:
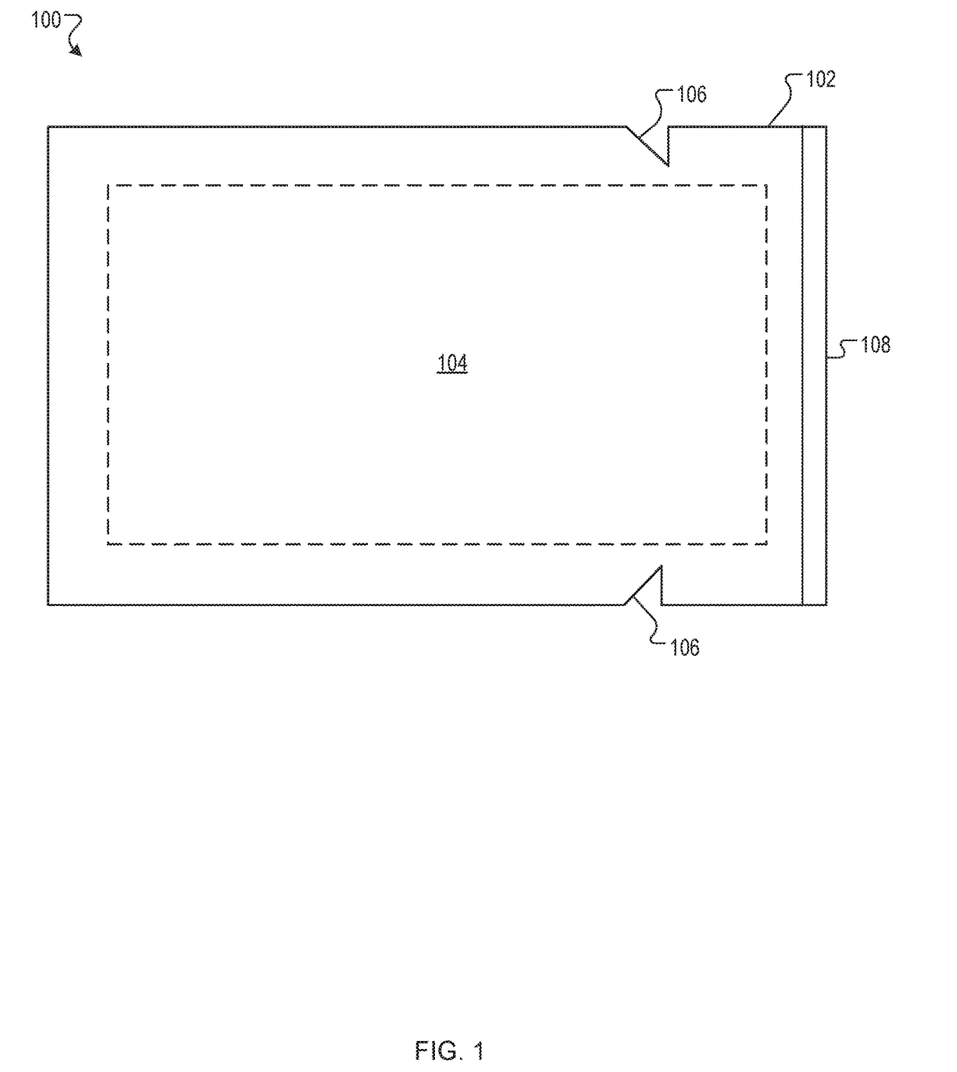
FIG. 1 illustrates a schematic view of one example of a container with a compartment and tear notches.

FIG. 1 illustrates a schematic view 100 of one example of a container 102 with a compartment 104 and tear notches 106. The compartment 104 may store a material within the container 102. In one example, the compartment 104 may store 2 milliliters (ml) to 1 ml of fluid. In another example, the compartment 104 may store approximately 2-10 drops of fluid or 0.001-0.003 fluid ounces (fl oz) of material and having an approximate length between 7.5 cm and 8.5 cm, an approximate width between 4.0 cm and 5.5 cm, and an approximate thickness of between 0.1 cm and 0.7 mm. In another example, the compartment 104 may store approximately 5-6 drops of fluid or 0.0015 fluid ounces (fl oz) of material and having an approximate length between 7.5 cm and 8.5 cm, an approximate width between 4.0 cm and 5.5 cm, and an approximate thickness of between 0.3 cm to 0.7 cm.

The container 102 may provide the ability to carry fluids such as olive oil, essential oils, cooking or other oils, liquid medications, liquid makeup, moisturizers, lotions, and so forth. For example, the packet having a shape and a thickness to fit within a slot that holds a credit card or business card. It may also carry scents such as cologne or perfume, powders such as medications, makeup, and so forth. The container may also be useful to carry mixtures such as oil and vinegar for salads, epoxy, an activation compound, a coupling compound, or a combination thereof. Other potential materials may include gels such as personal lubricants, hand sanitizer, medical or other adhesives, supplements such as energy gels, and so forth. Other types of materials for other purposes may also be contained within the container. The types of materials carried in the container are not intended to be limiting. The container may hold various types of materials and various amounts of the material. In one example, the container does not include metal so as to avoid issues with metal detection, magnetization, oxidation, and so forth.

In one example, the container 102 is rectangular in shape. As discussed below, the container 102 may be approximately the size of a credit card or a business card to fit in a slot of a wallet, a purse, a business card holder, smartphone case, planner, binder, first aid kit, a money clip and so forth. In another example, the container 102 may have a square, circular, or other geometry.

In one implementation, the container 102 may be made of a plastic. In another implementation, the container 102 may be made of a metal. In one implementation, the container 102 may be made of a foil or stainless steel. In another implementation, the container 102 may be made of a material that is a cast or extruded material. In another implementation, the container 102 may be made of a polyimide film, synthetic wood veneer, magnetic material, polycarbonate, acrylic, polypropylene, nylon, and so forth. In one example, the materials may be biodegradable or recyclable.

In one implementation, the container 102 may include a polymer, a monomer, a thermoplastic, a thermoset, or other plastics and non-plastic materials. For example, the container 102 may be poly-ethylene (PE) material or a polyester film. In one example, the container 102 may include a polyester film such as biaxial-orientation polyethylene terephthalate (boPET). In one implementation, the container 102 may include a single layer of material. In another implementation, the container 102 may include multiple layers of a single material. In another implementation, the container 102 may include multiple layers of different materials. For example, the container 102 may include a combination of a metal foil and a polyester film.

The material of the container 102 may provide thermal insulation, light insulation (light-blocking), gas and aroma barring, chemical stability for content in the compartment 104 of the container 102. In one example, the container 102 may include an interior layer or treatment may be applied to provide a chemically resistive barrier contents in the container 102.

For example, the content may be olive oil and the container 102 may be made of a material (such as boPET) to insulate the oil olive from thermal variations and temperature extremes. Temperature extremes may include high temperatures (such as above 100 degrees Fahrenheit) and low temperatures (such as below 30 degrees Fahrenheit). The thermals insulation may reduce a spoiling of the content. In another example, the material for the container 102 may provide a barrier or insulating layer to protect the olive oil from air, light, moisture (e.g., water impermeable), or vapors. When the olive oil is exposed to air, light, moisture, or vapors, a shelf life of the olive oil may be reduced from years to a few days or months because the air, light, moisture, or vapors may cause the olive oil to spoil or turn rancid. The material providing the barrier or insulating layer may increase a shelf life of the content in the compartment 104.

The flexibility or stiffness of the container 102 may be a measure of the resistance of the container 102 to deform. For example, the container 102 may be relatively flexible or stiff, as measured by stiffness (k) in pounds per inch for the material of the container 102. The stiffness of the material may be defined by $k=F/\delta$, where k is defined as stiffness in pounds (lb) per inches (in), F is defined as applied force to the container 102, and $\delta$ is defined as a displacement of the force over the container 102. In one implementation, the container 102 may be relatively stiff with an approximately k value of 1 through 10 k.

The container 102 may be relatively stiff to enable a user to more easily slide the container into a slot, such as a credit card slot or a business card slot as discussed below, because the container 102 may be rigid and not bend when being inserted into the slot. In another implementation, the container 102 may be relatively flexible with an approximately k value of less than 1 k. The container 102 may be relatively flexible so that the container 102 may flex with a holder (such as a slot, a housing, or a cavity) that the container 102 is inserted into, such as a wallet as discussed below. The flexibleness of the container 102 can enable the container 102 to avoid breaking or wearing out when the container 102 is inserted or stored the holder because as the holder flexes or bends, the container 102 may also flex and bend. The material of the first lamina and the second lamina and the combined thickness of the first lamina, the second lamina, and the fluid are such that a flexibility of the packet to conform to the slot without bursting is increased. For example, the material of the first lamina and the second lamina may be bi-axially-oriented polyethylene terephthalate material. When the bi-axially-oriented polyethylene terephthalate material is approximately 0.5 mm thick, the packet may have a low K value so that the container 102 is flexible to fit into the credit card slot or the business card slot. The bi-axially-oriented polyethylene terephthalate material may also be durable to prevent leaks or punctures while the container 102 is stored in the credit card slot or the business card slot because the bi-axially-oriented polyethylene terephthalate material has a relatively highly durable and puncture resistant.

In one implementation, the material for the container 102 may be durable. Durability may be defined as a shear strength of the material of the container 102, an ultimate tensile strength (UTS) of the material of the container 102, a compressive strength of the material of the container 102, or an amount of energy the material of the container 102 may absorb without fracturing or rupturing (i.e. puncture resistance). The container may be durable to protect or shield the content in the compartment 104 of the container 102. For example, the container 102 may be made of boPET, which is relatively durability with a UTS of 34,000 pounds per square inch (psi).

In one implementation, an exterior surface of the container 102 may facilitate application of a label, print, branding, instructions, warnings, or other indicia or images on the exterior surface of the container 102. This may be facilitated by the material of the container or application of a surface layer or treatment.

In one example, the container 102 may include one or more tear notches 106. Each tear notch 106 may provide a relatively easy indicator and structural feature to access the contents of the container 102. Tear notches 106 may be located along any of the edges or sides of the container 102. For one example, one or more tear notches 106 may be located on each of the edges or peripheries of the container 102. In another example, one or more tear notches 106 may be located on less than all of the edges of the container 102. In the illustrated example, the tear notch 106 is a cut-away portion at an edge of the container 102. In other examples, the tear notches 106 may include a simple cut in the side of the container 102. In one example, the tear notches 106 may be open at the edge of the container 102. In another example, the tear notches 106 may not open the edge of the container 102 but be a through hole made approximate and interior to the edge of the container 102 such that no interruption in the edge of the container 102 is created to form a snag location which may cause the container 102 to be opened accidentally.

The tear notches 106 may also include a visual indicator such as an arrow, label, instructions such as "tear here," or other indicia or indicators. In one example, the container 102 may include a variation in the structure of the container 102 aligned with one or more of the tear notches 106 to facilitate tearing of the container 102 along a path or in a direction from the tear notch 106 across the container 102. Such a tear guiding structure may prompt or facilitate tearing of the container 102 in a specific pattern or manner to provide access to the compartment 104 in a certain form such as tearing off only a corner or tearing across a width or height of the container 102.

The tear notches 106 are not intended to be limiting and the container 102 may include other structures to access the compartment 104. In one example, the outer perimeter of the container 102 may be sealed together. A portion of the outer perimeter 108 may not be sealed together and an individual may peel apart the portion of the outer perimeter 108 and a portion of the sealed outer perimeter to access the compartment 104. In another example, the structure may be a perforation or another type of thinned or weakened location on the container 102.

While specific dimensions and ranges of dimensions are provided herein, it should be noted that these dimensions are provided as examples and, as presented herein, should not be construed as constraining every possible embodiment of the container. Other dimension and ranges of dimensions may be used for the container to accommodate certain features, functionality, storage schemes, aesthetics, design considerations, or other factors.

Figure 2:
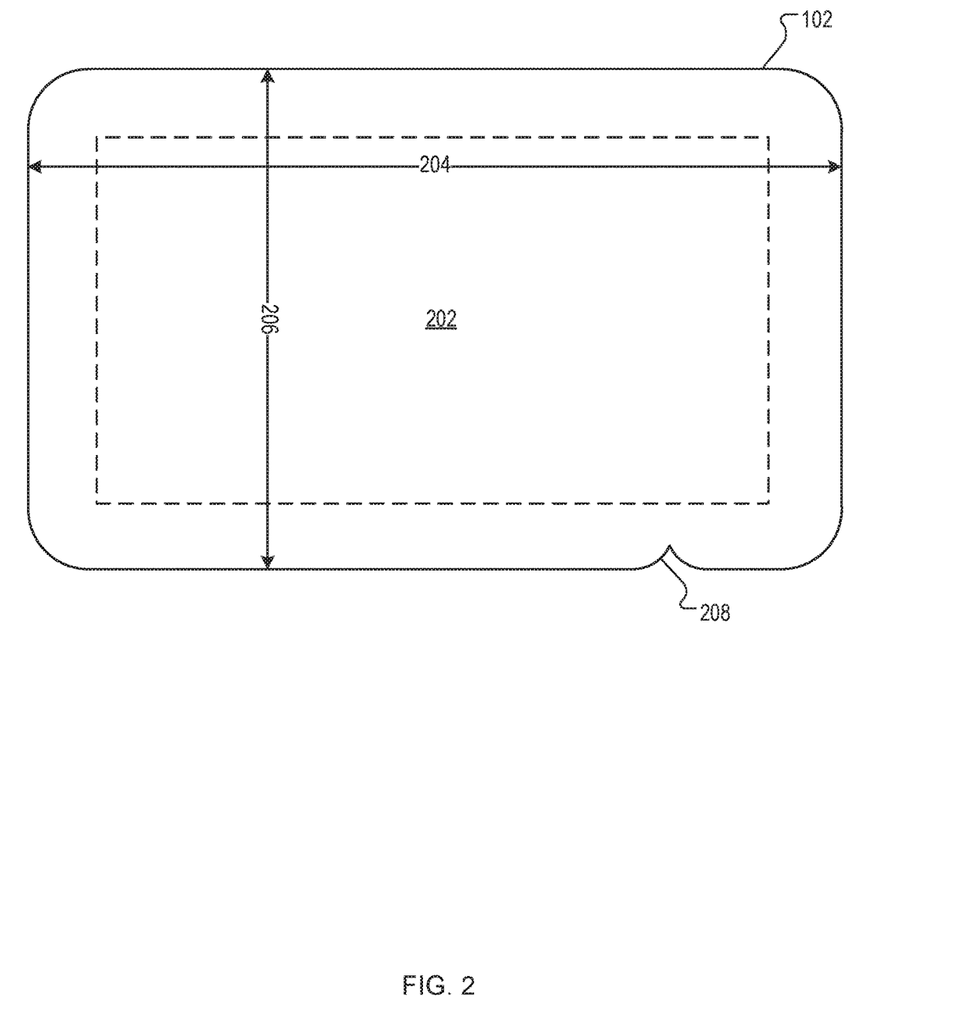
FIG. 2 illustrates a schematic view of another example of a container.

FIG. 2 illustrates a schematic view of one example of a container 202. The container 202 may have a major dimension 204 and a minor dimension 206. In one example, the major dimension 204 and minor dimension 206 are such as to mimic or approximate those of a standard card such as a credit card or business card. For example, the major dimension 204 may be equal to approximately 86 millimeters (mm) with the minor dimension 206 equal to approximately 54 mm. In another example, the major dimension 204 may be within a range from approximately 45 mm to 90 mm while the minor dimension 206 may range from approximately 30 mm to 60 mm. In another example, the major dimension 204 may be between 8 mm and 9 mm and the minor dimension 206 may be between 4.5 mm and 6 mm in width. The length of the major dimension 204 and the minor dimension 206 is not intended to be limiting. Other dimension and ranges of dimensions may be applied.

In one example, the container 202 may have major and minor dimensions 204 and 206 to fit to a specific carrying scheme such as a credit card slot in a wallet, a luggage card slot, a business card holder, a folio pocket, a coin pouch or pocket, a badge sleeve, condom pouch, or any other of a variety of carrying locations or structures. In one example, the slot may be approximately 3.5 cm in width and 2 cm in height. In another example, the slot may be approximately 2 cm in width and 3.5 cm in height.

In one example, the container 202 may be shaped to be inserted and held in a slot of a carrier, where held is defined as to retain the container 202 in the slot so that it does not fall out or move around. The slot may be large enough to fit the container 202 and small enough to secure the oil vault. In another example, the container 202 may be shaped to be accommodated in a slot of a carrier. Accommodated is defined as to be larger than the container 202 so that the container 202 may be stored in the slot and may be movable within the slot.

The corners of the container 202 may be square or rounded. In one example, the corners may be uniform. In another example, one or more of the corners may differ in geometry from one or more of the other corners of the container 202. In one example, the radius of one or more corners of the container 202 may be within a range of approximately 2.9 millimeters to 3.5 millimeters. Other radius ranges or corner geometries may be implemented. The tear notch 208 of the container 202 may be located along any edge of the container 202. For example, the tear notch 208 may be located on a longer side at approximately 20 millimeters from the nearest corner of the container 202. Other locations and orientations of the tear notch 208 may be implemented.

While specific dimensions and ranges of dimensions are provided herein, it should be noted that these dimensions are provided as examples and, as presented herein, should not be construed as constraining every possible embodiment of the container. Other dimension and ranges of dimensions may be used for the container to accommodate certain features, functionality, storage schemes, aesthetics, design considerations, or other factors.

Figure 3:
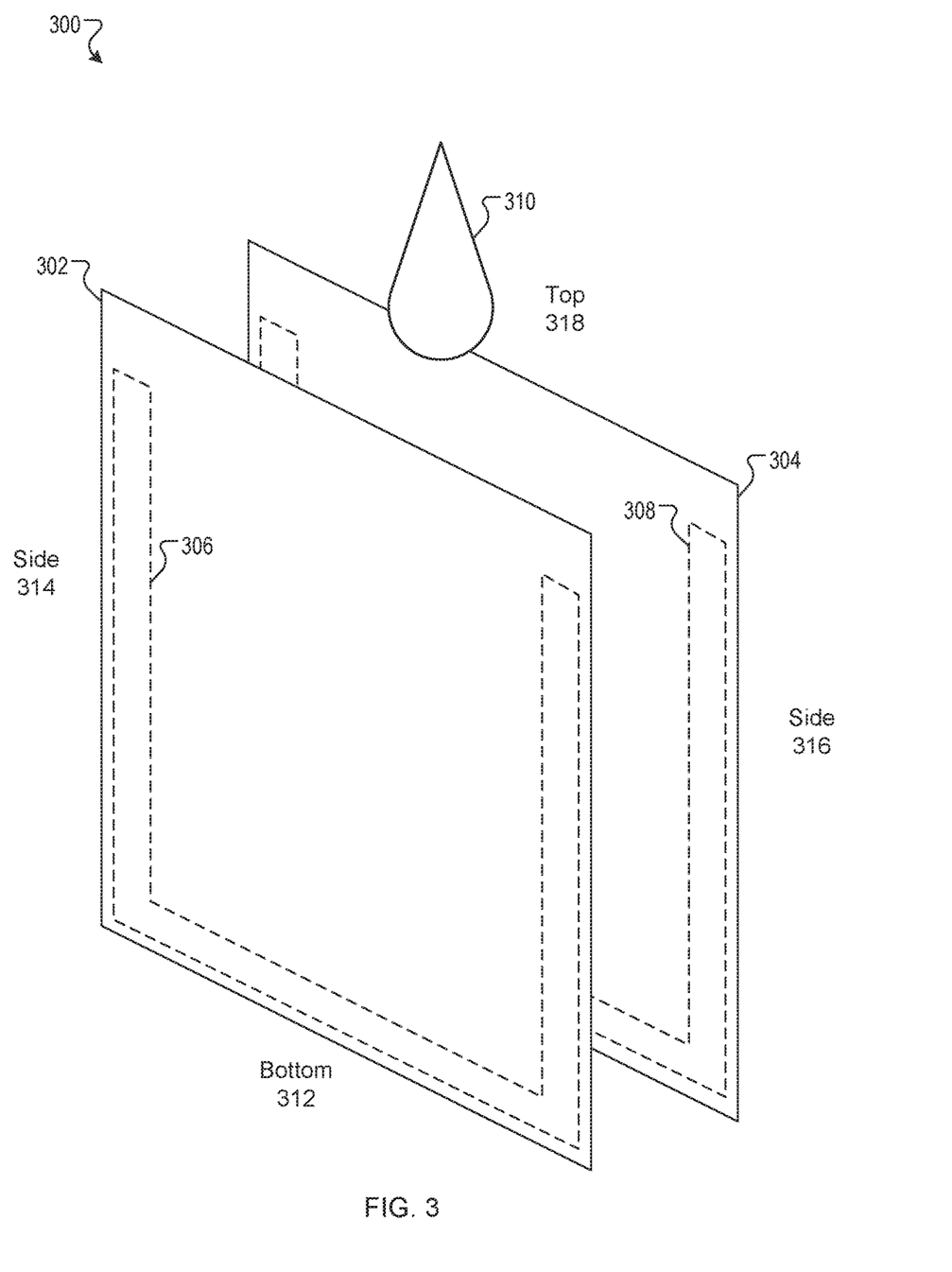
FIG. 3 illustrates an exploded perspective view of one example of an assembly of a container.

FIG. 3 illustrates an exploded perspective view of one example of an assembly of a container 300. The container 300 can include a first lamina 302 and a second lamina 304. The first lamina 302 includes a first sealing region 306 (also referred to herein as a peripheral region). The first lamina 302 and the second lamina 304 may each be between 8 cm and 9 cm in length, between 4.5 cm and 6 cm in width, and approximately 0.5 cm thick. A combined thickness of the first lamina 302, the second lamina 304, and the content may fits within a volume of approximately 1.5 mm.

The second lamina 304 includes a second sealing region 308. The first sealing region 306 may be approximately 3 mm to 5 mm in width and may be located approximate at least a portion of an outer periphery of the first lamina 302. The second sealing region 308 may be approximately 3 mm to 5 mm in width and may be located approximate at least a portion of an outer periphery of the second lamina 304. In one example, the first sealing region 306 may be located approximate a bottom 312, a first side 314, and a second side 316 of the outer periphery of the first lamina 302. In another example, the second sealing region 308 may be located approximate a bottom 312, a first side 314, and a second side 316 of the outer periphery of the second lamina 304.

During assembly of the container 300, the first lamina 302 may be aligned with the second lamina 304 such that the first sealing region 306 and the second sealing region 308 are aligned with one another. The first and second sealing region 306 and 308 may be sealed together to join the first lamina 302 to the second lamina 304. The joining of the two laminas 302 and 304 around a portion of the peripheral region may be achieved through an application of heat (e.g., a heat seal), a sealant, an adhesive, a bonding agent, force or pressure, welding, compression (e.g., a compression seal), or another process or operation. Once the two laminas 302 and 304 are partially sealed, content 310 is placed between the laminas 302 and 304 in the partially sealed compartment. In one example, the content 310 may be injected, sprayed, or poured between the laminas 302 and 304. In other examples, the partially sealed container 300 may be dipped or submerged into a larger quantity of the content 310 to capture a quantity of the content 310 between the laminas 302 and 304. Other manners of filling the container 300 may be implemented.

Figure 4:
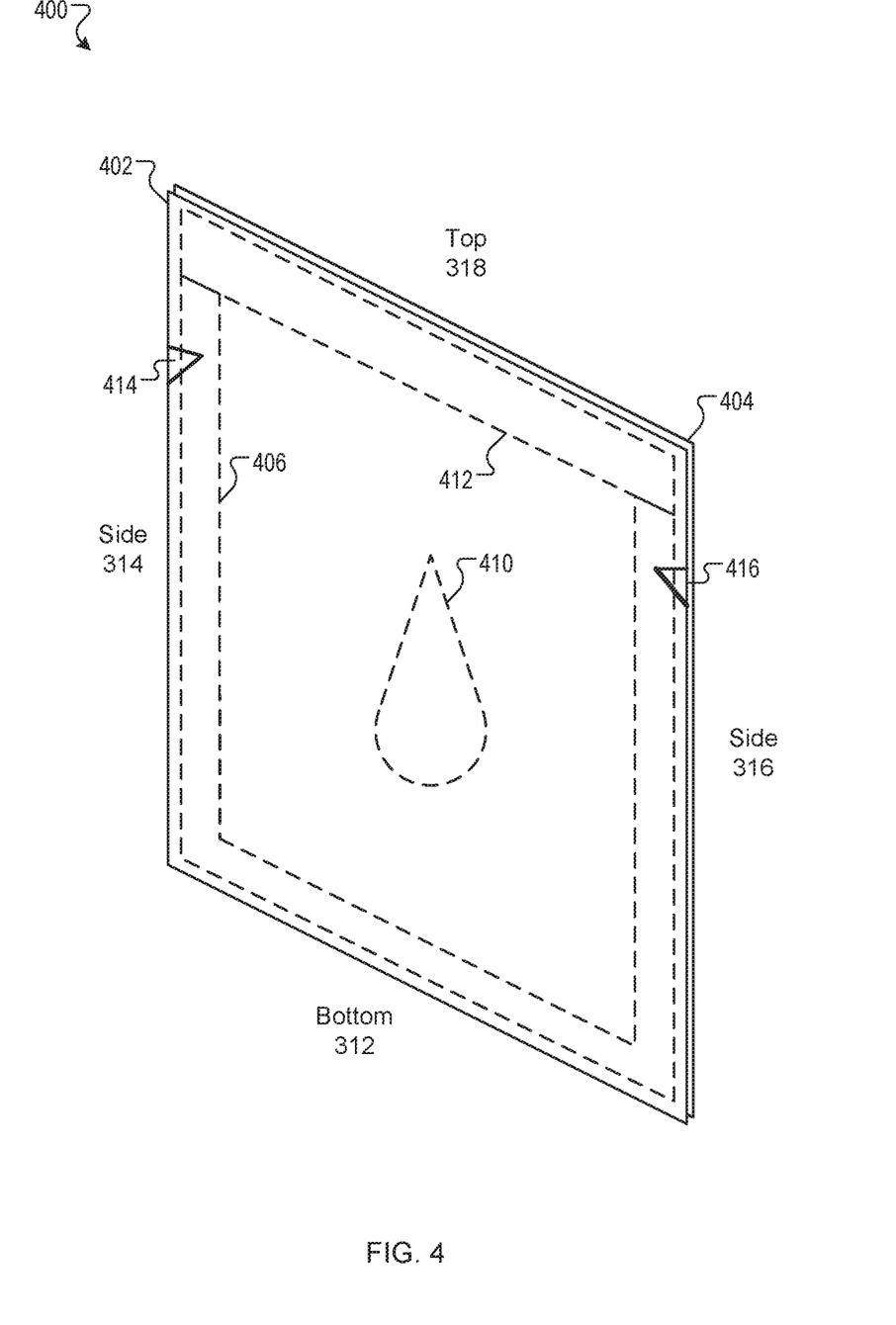
FIG. 4 illustrates a perspective view of another example of an assembly of a container.

FIG. 4 illustrates a perspective view of another example of an assembly of a container 400. Some of the features in FIG. 4 are the same or similar to the some of the features in FIG. 3 as noted by same reference numbers, unless expressly described otherwise. The container 400 is sealed with a first lamina 402 and a second lamina 404 joined at an initial seal 406. The final seal 412 may be approximately 3 mm to 5 mm in width and may be located approximate a top 318 of the container 400 along an outer periphery of the first lamina 402 and the second lamina 404. In one implementation, after the initial seal 406 has been made, the content 410 may be inserted within a compartment of the container 400. When the content 410 has been inserted within the compartment, the final seal 412 may be closed to seal the material in the compartment. For example, the initial seal 406 and the final seal 412 may provide sufficient enclosed space within the container 400 to contain between 0.1 fl oz and 0.5 fl oz of content 410. The quantity of the content 410 may be measured by volume, weight, or some other metric. Other quantities of material and seal sized may be used. As discussed above, in one example one or more sides of the container 400 may be sealed, the content may be added into the partially sealed container 400, and then the container may be completely sealed. In another implementation, the content may be placed onto a portion of the first lamina 402 and then the second lamina 404 may be sealed to the first lamina 402. For example, 0.3 fl oz of olive oil may be placed onto the center of the first lamina 402 and then the second lamina 404 may be affixed or sealed to the first lamina 402 to seal the olive oil into a compartment between the first lamina 402 and the second lamina 404. The first lamina 402 and the second lamina 404 may be the same size.

Once a sealing of the container 400 has been completed, the initial seal 406 and the final seal 412 may form a continuous seal around the outer periphery of the container 400. In one example, to form the initial seal 406 and the final seal 412, the portion of the first lamina 402 and the second lamina 404 to be sealed together may be heated to between approximately 300 degrees Fahrenheit and 350 degrees Fahrenheit.

In one implementation, the final seal 412 may include a re-sealable structure such as a slider-less zipper, repositionable adhesives, and so forth. In another implementation, the initial seal 406 and the final seal 412 may be an air-tight seal, a hermetic seal, and/or a water-tight seal. In another implementation, the portion of the initial seal 406 along a first edge (e.g., long edge) of the container 400 may be 5 millimeters while the portion of the initial seal 406 along a second edge (short edge) as well as the final seal 412 may be 7 millimeters wide.

In one implementation, the container 400 may include a first notch 414 and/or a second notch 416 along a periphery of the first lamina 402 and the second lamina 404. For example, the first notch 414 may be located at the first side 314 along a periphery of the container 400 and the second notch may be located at the second side 316 along a periphery of the container 400. The first notch 414 and the second notch 416 may be partially inset into the periphery of the container 400. In one example, the first notch 414 and/or the second notch 416 may be formed in the first lamina 402 and in the second lamina 404 prior to sealing the first lamina 402 and the second lamina 404 together. In another example, the first notch 414 and/or the second notch 416 may be formed in the first lamina 402 and in the second lamina 404 after sealing the first lamina 402 and the second lamina 404 together.

A user may use the first notch 414 and the second notch 416 to open the container 400 to access the content 410. The first notch 414 and the second notch 416 may be inset into the container 400 to provide a tearing point for an individual to open the container while maintaining the initial seal 406 and the final seal 412. For example, the first notch 414 and the second notch 416 may be inset approximately half way into the initial seal 406 or the final seal 412. When the initial seal 406 or the final seal 412 is 5 mm in width, the first notch 414 and the second notch 416 may be inset approximately 2.5 mm into the initial seal 406 or the final seal 412.

In one implementation, the compartment between the first lamina 402 and the second lamina 404 may store approximately 0.0015 fl oz of material. The compartment may have an approximate length between 7.5 mm and 8.5 mm, an approximate width between 4.0 mm and 5.5 mm, and an approximate thickness of between 0.1 mm and 0.7 mm.

Figure 5:
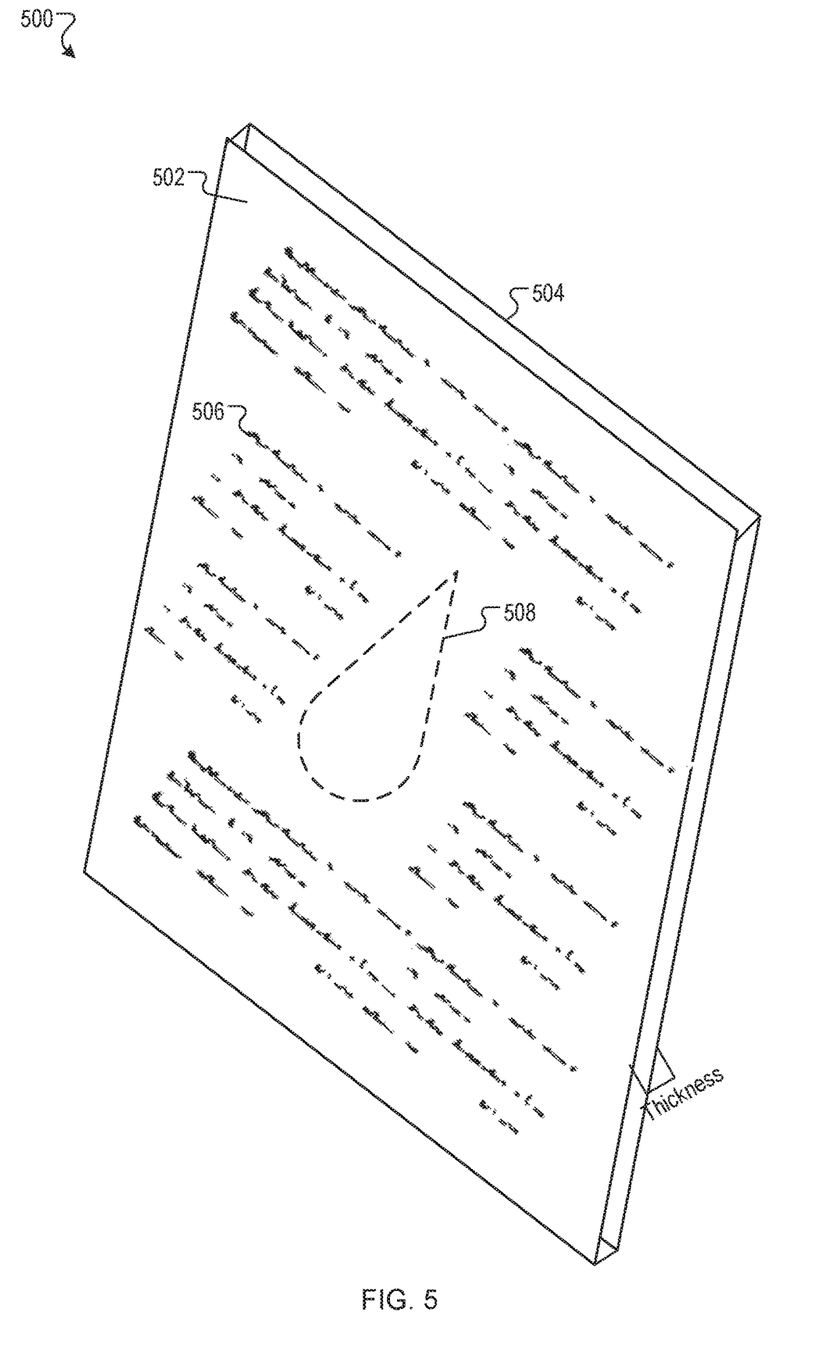
FIG. 5 illustrates a perspective view of another example of an assembly of a container.

FIG. 5 illustrates a perspective view of one example of an assembly of a container 500. The container 500 may include indicia 506 on an outer surface of a first lamina 502 or a second lamina 504. In one example, the indicia 506 may be instructions on how to use the container 500 or a list of ingredients for the material 508 inside a compartment of the container. In another example, the container 500 may store olive oil used for religious purposes, such as anointed blessings. The exterior surface of the container 500 may include indicia and/or graphics indicating how to use olive oil for the religious purposes, such as scripture references associated with the anointed blessings.

In one implementation, the container 500 may be approximately 0.76 mm thick. As discussed below, the container 500 may be approximately the same dimensions as a credit card or business card so that the container 500 may fit in a wallet, purse, or other containers with credit card slots. In another implementation, a combined thickness of the first lamina, the second lamina, and the fluid of the container 500 may fit within a volume having a defined thickness so that a first surface of the first lamina and a second surface of the second lamina is substantially flat. In one example, flatness may be defined as a surface without lumps or indentations in the surface of the first lamina or the second lamina. In another example, flatness may be defined as a thickness of an item in a defined. In one example, the volume for the defined thickness may be between 2 mm and 5 mm. In another example, the volume for the defined thickness may be 3 mm. The first lamina 502, the second lamina 504, and the fluid may be combined to form a substantially flat container with flat top and bottom surfaces within a defined volume, such a volume having a thickness of 3 mm.

Figure 6:
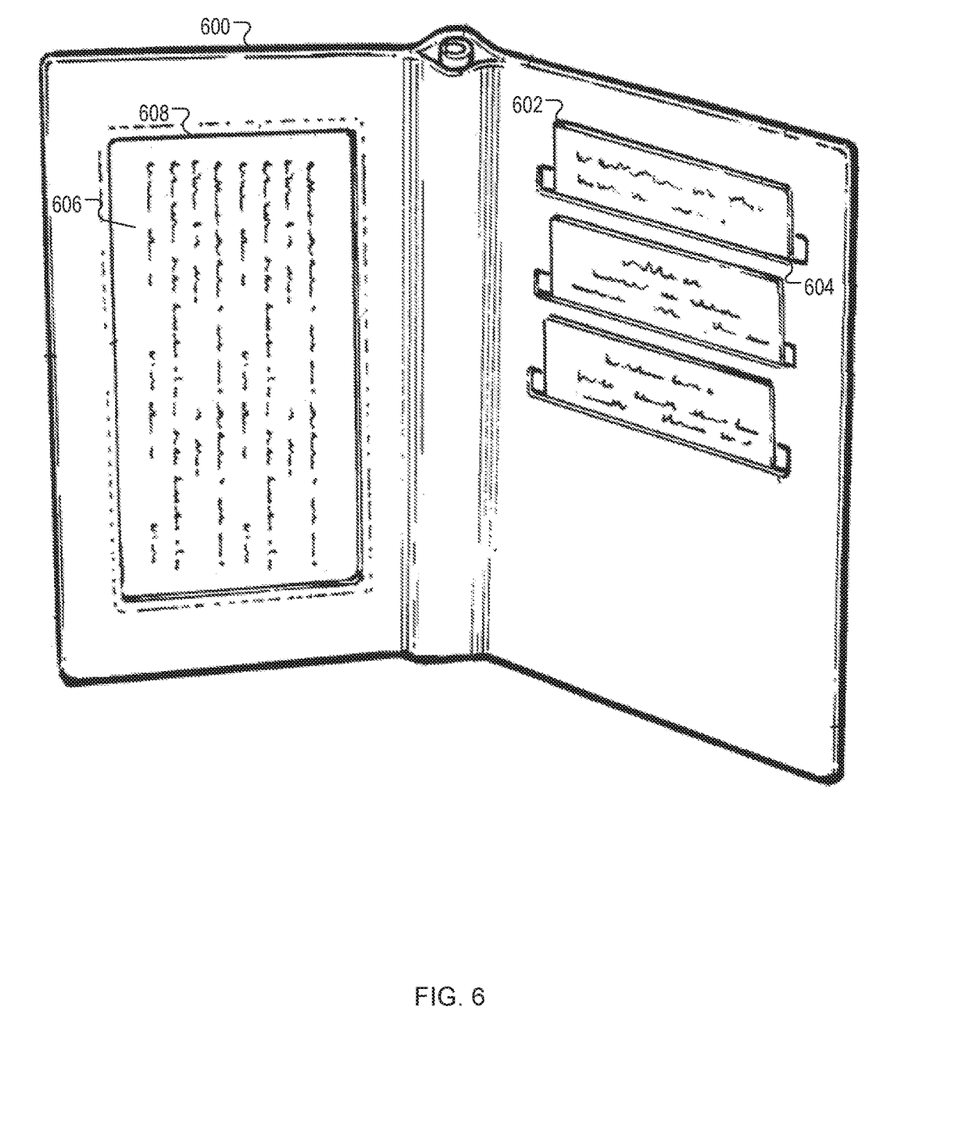
FIG. 6 illustrates a wallet storing containers according to one embodiment.

FIG. 6 illustrates a wallet 600 storing containers 602 and 606 according to one embodiment. The wallet 600 may include a credit card slot or business card slot 604 and a personal identification card pocket 608. In one implementation, the container 602 may be shaped to fit inside the credit card slot or business card slot 604. As discussed above, the dimensions of the container 602 may be approximately the same as a credit card. The container 602 may be flat to fit into the credit card slot or business card slot 604. In another implementation, the personal identification card pocket 608 may be shaped to hold a personal identification card, such as a driver's license. The dimensions of the container 606 may be approximately the same as the personal identification card. The container 606 may be shaped to fit inside the personal identification card pocket 608.

As discussed above, the container 602 may be shaped to fit into the credit card slot or business card slot 604 or personal identification card pocket 608 and the amount of fluid stored in the container 602 to avoid bursting, leaking, or spilling when pressure is applied to the wallet 600. For example, the ideal gas law to compare the container 602 to a standard condiment packet (e.g., a ketchup packet). The ideal gas law approximates gas and fluid under different conditions. The ideal gas law may be defined as PV=nRT, where P is the pressure of the content, is the volume of the content, n the amount of substance, R is constant, and T is an absolute temperature of the contents.

The container 602 may store approximately 0.001 fl oz of contents and the container may be approximately 8.5 cm in length, 5 cm in width, and 1.5 mm thick and the standard condiment packet (e.g., a ketchup packet) may store 0.0015 fl oz of condiment and the standard condiment packet may be approximately 6.5 cm in length, 2 cm in width, and 1 cm thick. If a person were to place the condiment packet in the credit card slot or business card slot 604 or personal identification card pocket 608 of the wallet 600 and the person were to place the wallet in his back pocket, when the person sits down and applies pressure to the wallet 600, the condiment packet would burst. The bursting would occur because when the pressure for the volume is applied to the condiment packet, a volume of the condiment packet and type of material of the condiment packet would not be able to disperse the pressure on the condiment packet across the condiment packet and the pressure on the volume would exceed an amount of pressure the condiment packet may withstand. Because the containers 602 and 606 are relatively flat as compared to the condiment packet and stores a smaller amount of content as compared to the condiment packet, when the containers 602 and 606 are stored in the wallet 600, when pressure is applied to the containers 602 and 606 within the wallet (such as when a person sits on their wallet), the containers 602 and 606 can equally distribute the force for the volume across the containers 602 and 606 and the material of the containers 602 and 606 avoid bursting, leaking, or spilling.

In one implementation, the combination of the material, width, height, thickness, and volume of content (such as fluid) for the container 602 or 606 may withstand the force applied to the wallet 600 from a person sitting on it. The weight of the person may range from 80 pounds (lbs) to 550 lbs. The amount of force may be measured in foot pounds, pound force, force, avoirdupois pound, and so forth. For example, when the containers 602 and 606 are stored in the credit card slot or business card slot 604 or personal identification card pocket 608 of the wallet 600, the containers 602 and 606 may withstand the pound force applied by a child or adult sitting on the wallet without bursting, leaking, or losing a seal.

Figure 7:
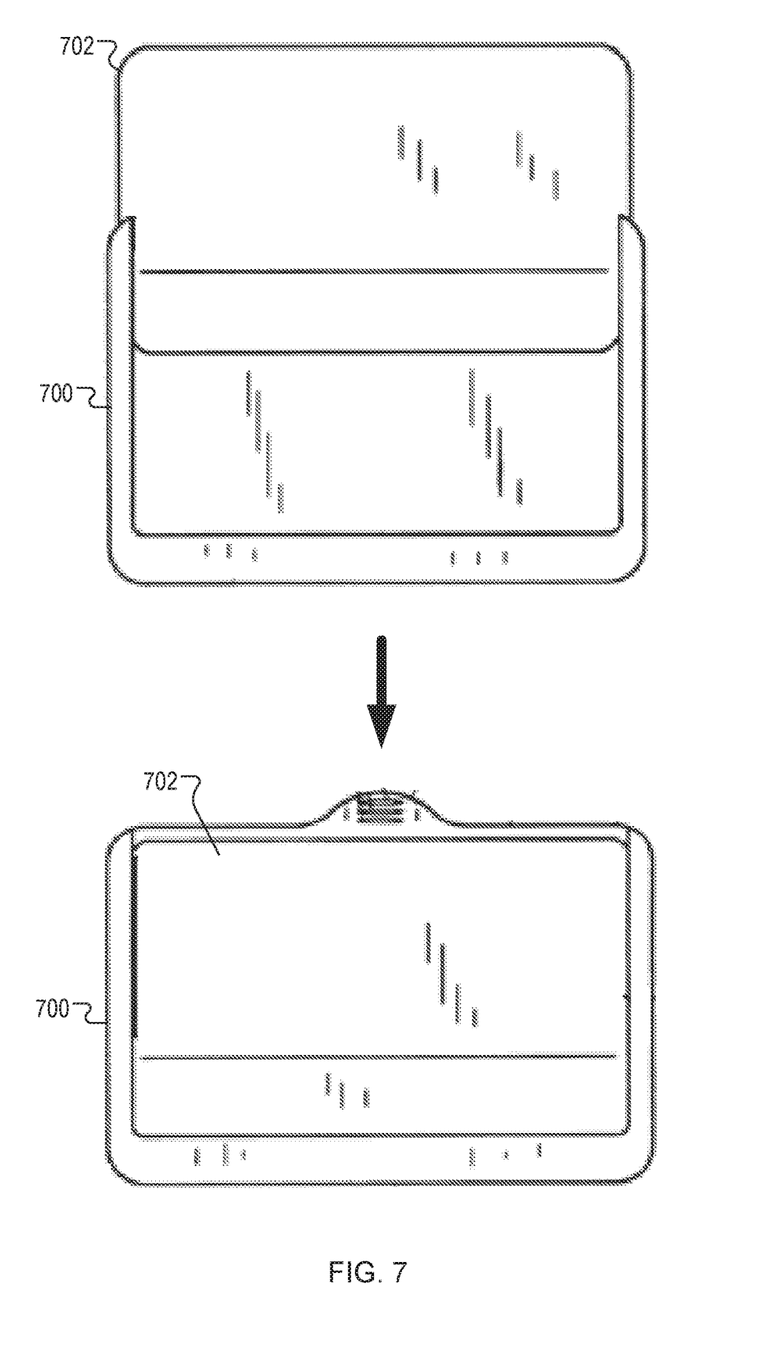
FIG. 7 illustrates a card holder storing a container according to one embodiment.

FIG. 7 illustrates a card holder 700 storing a container 702 according to one embodiment. The card holder 700 can be shaped to hold an identification card, such as an employee ID card or military ID card. The container 702 may be approximately the same dimensions as the employee ID card. The card holder 700 may include a slot for the employee ID card to be inserted into. Where the container 702 may be approximately the same dimensions as the employee ID card, the container 702 may be inserted into the slot of the ID card holder 700. In one example, the slot may have a slot with a depth to hold the container 702 and the employee ID card. For example, a nurse, a doctor, or a soldier may carry the cardholder 700 with an employee ID card to identify them. The individual may desire to also carry the container 702 in the card holder 700 and may insert the container 702 behind the employee ID card and carry both of them around in the same card holder 700.

In one example, a hospital or military personnel may be restricted on what personal items they may carry while at work. For example, the military personnel may only carry what is issued by the military a few small personal items to reduce the amount of weight the military personnel carries when training, moving, or in combat. Similarly, the hospital personnel may be restricted on the amount of personal items they can carry to reduce the spread of contagions that may adhere to the surfaces of personal items. The hospital and military personnel typically carry a card holder 700 for identification, authentication, and security purposes. The container 702 being shaped to fit in a slot of card holder 700 can enable the hospital and military personnel to carry the contents stored in the container 702 while staying within the restrictions on the personal items.

Figure 8:
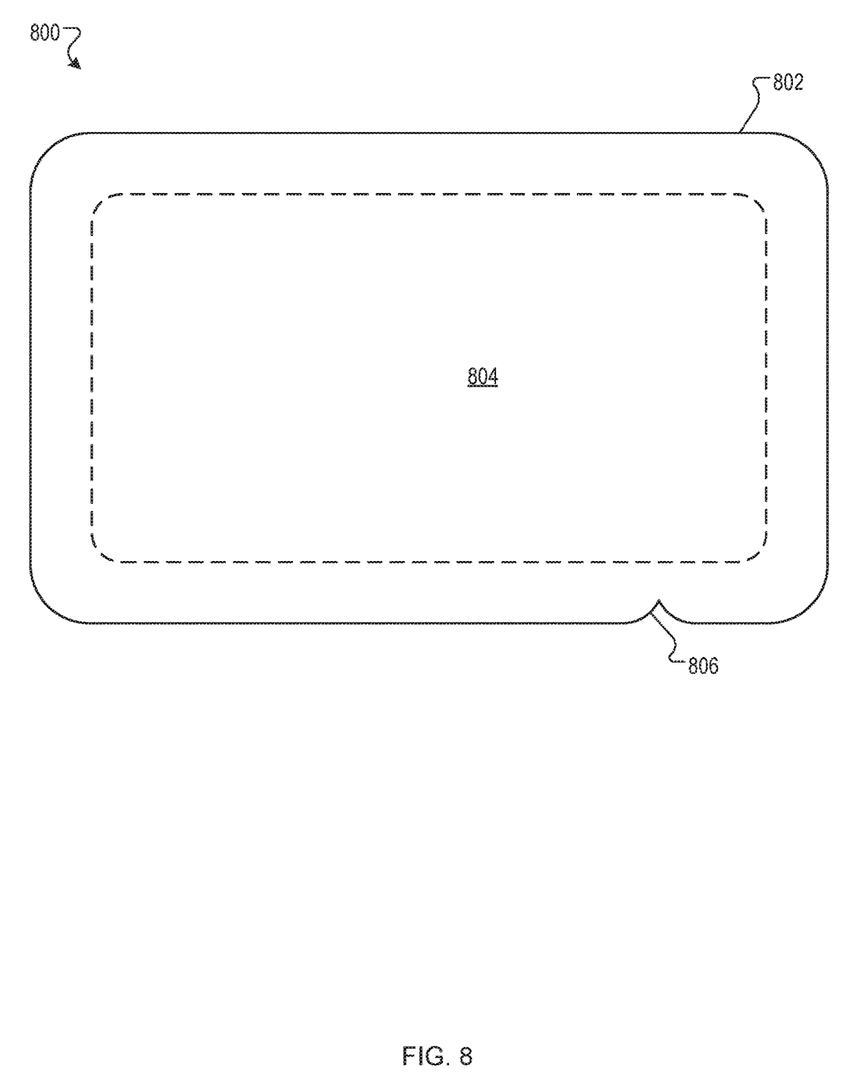
FIG. 8 illustrates a schematic view of another example of a container.

FIG. 8 illustrates a schematic view 800 of another example of a container 802. The container 802 may be rounded corners on the exterior of the container 802 and/or within the compartment 804. The rounded corners may provide for easier use or carriage of the container 802 in wallets, pockets, sleeves, or other storage locations. In one example, the round corners may fit into a credit card slot or business card slot easier because the rounded corners may not catch on the edges of the slot. In one example, the round corners may decrease a wearing out of the credit card slot or the business card slot because square edges may be a catch point when inserting the container into the credit card slot or the business card slot. The square edge may also a friction point between the container credit card slot or the business card slot that increase wear and tear to the container 802 and the credit card slot or the business card slot causing the container 802 to leak or the credit card slot or the business card slot to have a hole at an increased rate.

The tear notch 806 is also structured so as to prevent snagging while maintaining the function of providing an easy start location for opening the container 802. For example, the corners and edges of the container 802 are structured to prevent snagging and otherwise damaging wallets, pockets, or other storage locations as well as preventing damage or injuries while handling the container 802.

Figure 9A:
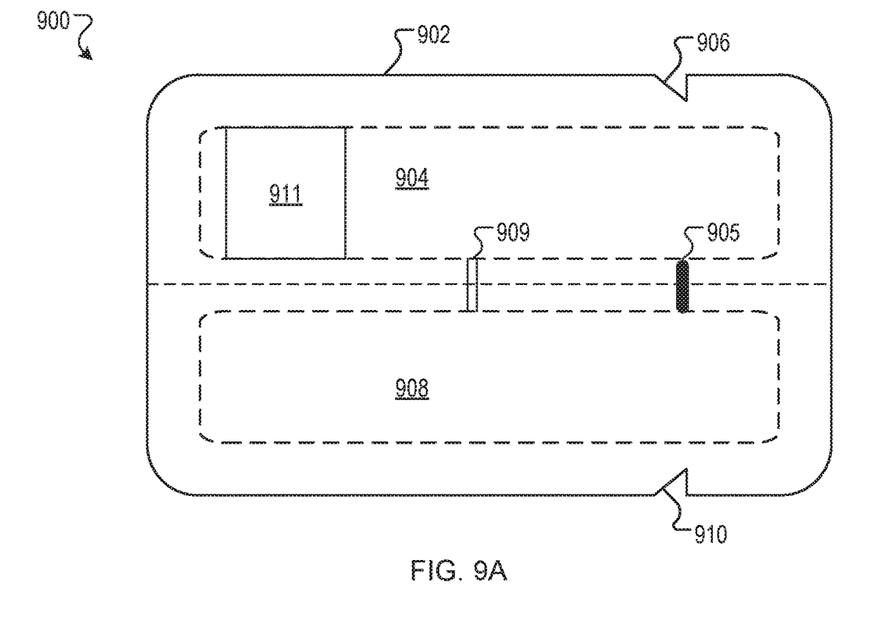
FIG. 9A illustrates a schematic view of one example of a multi-chamber container.

FIG. 9A illustrates a schematic view 900 of one example of a multi-chamber container 902. The multi-chamber container 902 includes a first compartment 904 with a corresponding first tear notch 906 and a second compartment 908 with a corresponding second tear notch 910. The illustrated example provides separate storage for a single material in both the first and second compartments 904 and 908 or two different materials in each of the first and second compartments 904 and 908. In one example, the multi-chamber container 902 may include a rip-stop feature 905 between the first compartment 904 and the second compartment 908. The rip-stop feature 905 may be a separate material or a toughened portion of the material of the multi-chamber container 902 to provide a barrier or stopping point when tearing open the multi-chamber container 902. The rip-stop feature 905 may facilitate opening one of the first or second compartments 904 and 908 without accidentally opening the other of the first or second compartments 904 and 908. In one example, the multi-chamber container 902 may provide a structure, such as a perforation 907, for separating the first compartment 904 from the second compartment 908 without opening either of the first or second compartments 904 and 908.

The multi-chamber container 902 may also include a mixing feature 909 between the compartments 904 and 908. The mixing feature may include a channel or weakness between the compartment 904 and 908 that may be opened through an application of force to move a material from one compartment to the other compartment. This mixing may be accomplished by applying a pressure, bending force, shearing force or actuating some other structure or feature of the multi-chamber container 902 to mix the contents of the first and second compartments 904 and 908. In one example, the multi-chamber container 902 may include a grip spot, an indicator, indicia, or other feature to communicate how or where on the multi-chamber container 902 to accomplish the mixing of the contents of the compartments 904 and 908.

In one implementation, one or more of the compartments 904 and 908 may include a treatment or liner specific to the material contained therein. For example, the first compartment 904 may include a feature such as a liner or treatment specific to the material contained in the corresponding compartment. For example, the liner or treatment may be included to shield a material from UV exposure to prevent spoliation or degradation of the material or provide thermal or chemical resistance. In another implementation, the first compartment 904 may include a transparent portion 911 to provide visual access to the material to identify the content or a quantity, state, or nature of the content. While two compartments 904 and 908 are described, the number and features of the compartments are not intended to be limiting. For example, as discussed below, the multi-chamber container 902 may include additional compartments.

Figure 9B:
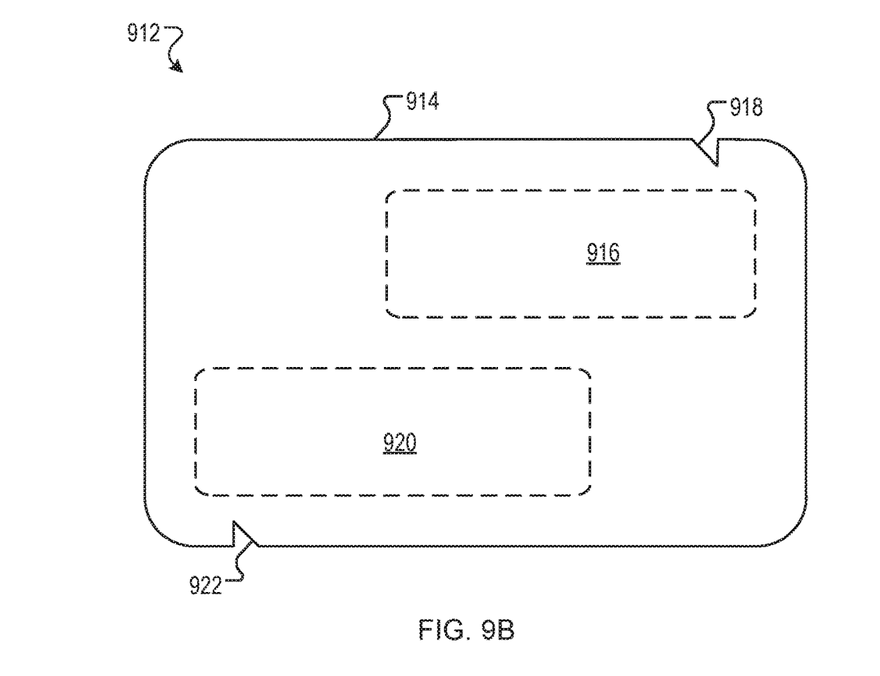
FIG. 9B illustrates a schematic view of another example of a multi-chamber container.

FIG. 9B illustrates a schematic view 912 of another example of a multi-chamber container 914. In the illustrated example, the multi-chamber container 914 includes a first compartment 916 with a corresponding tear notch 918. The first compartment 916 is offset from a second compartment 920. This arrangement of the compartments 916 and 920 may prevent unintentional opening of both compartments 916 and 920. As shown, the tear notches 918 and 922 may be oriented on the multi-chamber container 914 to align with the offset of the corresponding compartments 916 and 920.

Figure 9C:
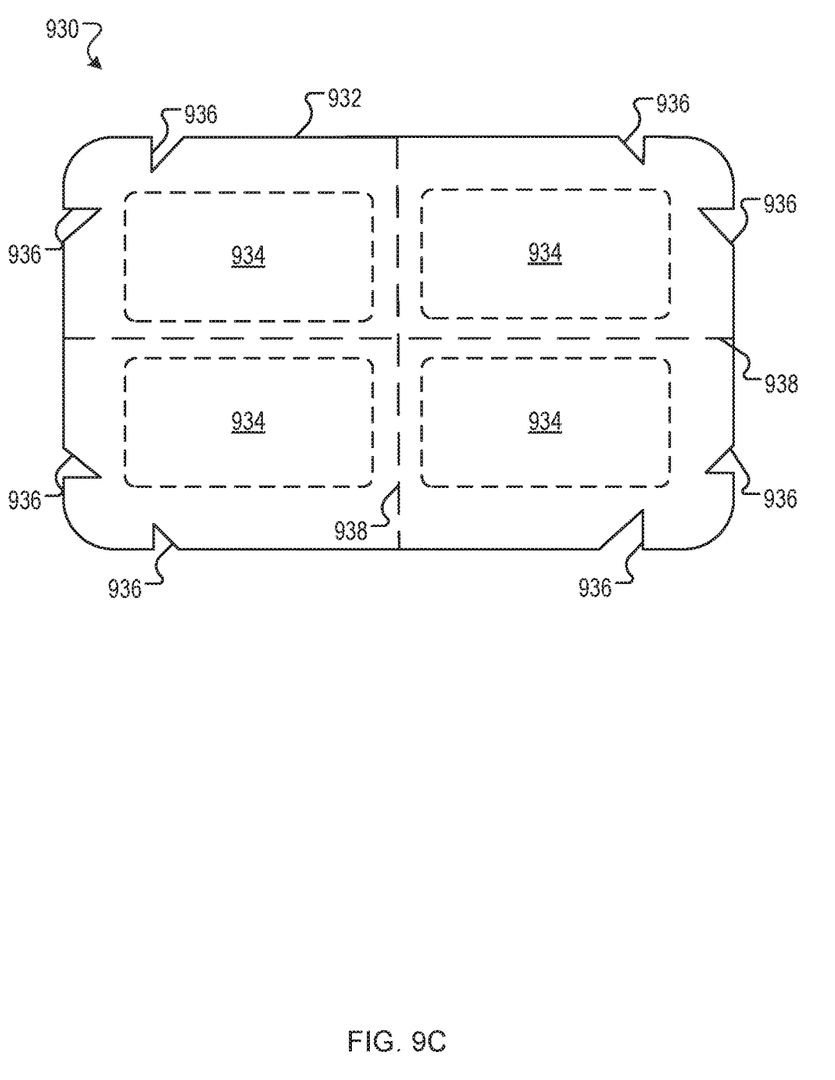
FIG. 9C illustrates a schematic view of another example of a multi-chamber container.

FIG. 9C illustrates a schematic view 930 of another example of a multi-chamber container 932. The multi-chamber container 932 includes four compartments 934. In one implementation, each compartment 934 may be identical to each other. In another implementation, each compartment 934 may be unique. In one implementation, each of the compartments 934 may contain identical materials. In another implementation, each of the compartments 934 may contain unique materials. As illustrated each of the compartments 934 may have one or more corresponding tear notches 936. The tear notches 936 may be aligned with an edge, center, or other portion of each compartment 934.

In the illustrated embodiment, the multi-chamber container 932 also includes separation structures 938, such as perforations as discussed above. The separation structures 938 may provide the ability to relatively easily separate the compartments 934 from one another. In one example, the separation structures 938 include a perforation in the multi-chamber container 932. In another example, the separation structures 938 may include thinned or otherwise weakened portions of the multi-chamber container 932. In one example, the separation structures 938 may be aligned with the corresponding compartment 934 to provide access to the compartment 934 at the time of separating the multi-chamber container 932 at the separation structure 938. One or more of the tear notches 936 may be omitted. In one example, the separation structures 938 may extend from one side of the multi-chamber container 932 to the opposite side. Other examples may include interrupted portions within the separation structures 938 to provide functionality to facilitate removal of a single compartment 934 without separation of other compartments of the multi-chamber container 932. Other examples may include other arrangements of the separation structures 938. The arrangements and placements of the tear notches 936 is not intended to be limiting and the arrangements and placements of the tear notches 936 may vary.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one example" or "an example" means that a particular feature, structure, or characteristic described in connection with the embodiment is included in at least one embodiment. Thus, the appearances of the phrase "in one example" or "in an example" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A multi-chamber container, comprising:
   olive oil;
   a first lamina comprising a first periphery and a first tear notch extending into the first periphery;
   a second lamina comprising a second periphery and a second tear notch extending into the second periphery;
   a first sealed chamber comprising:
      a first lateral edge; and
      a second lateral edge opposite the first lateral edge, wherein the first sealed chamber is formed by affixing the first periphery to the second periphery; and
   a second sealed chamber comprising:
      a third lateral edge; and
      a fourth lateral edge opposite the third lateral edge, wherein:
         the second sealed chamber is formed by the affixing the first periphery to the second periphery;
         the second sealed chamber is physically separated from the first sealed chamber;
         the first lateral edge of the first sealed chamber is laterally offset from the third lateral edge of the second sealed chamber;
         the second lateral edge of the first sealed chamber is laterally offset from the fourth lateral edge of the second sealed chamber;
         the first sealed chamber or the second sealed chamber is sized to store at least 0.2 milliliters (ml) of the olive oil and not greater than 1 ml of the olive oil;
         a combined thickness of the first lamina, the second lamina, and the olive oil is 3 millimeters (mm);
         a first surface of the first lamina and a second surface of the second lamina is substantially flat; and
         a combined thickness of the first lamina, the second lamina, and the olive oil, and the substantially flat first surface and second surface provide a shape and a thickness configured to fit within a slot of an object that holds a credit card;
a material of the first lamina and the second lamina provides a barrier between the olive oil in the chamber and an environment outside the chamber to reduce a spoiling of the olive oil; and
the material of the first lamina and the second lamina and the combined thickness of the first lamina, the second lamina, and the olive oil is such that a flexibility of the container to conform to the slot without bursting is increased.

2. The multi-chamber container of claim 1, wherein the first tear notch is aligned with the second tear notch.

3. The multi-chamber container of claim 1, wherein first lamina and the second lamina comprise bi-axially-oriented polyethylene terephthalate.

4. The multi-chamber container of claim 1, wherein the material of the first lamina and the second lamina and the combined thickness of the first lamina, the second lamina, and the olive oil is such that a force required to puncture the first lamina or the second lamina is increased.

5. A container, comprising:
olive oil;
a first sheet having a thickness of approximately 0.5 millimeters (mm), the first sheet comprising:
a first lateral edge;
a second lateral edge opposite the first lateral edge, a first distance between the first lateral edge and the second lateral edge is between 8 cm and 9 cm;
a first top edge; and
a first bottom edge opposite the first top edge, a second distance between the first top edge and the first bottom edge is between 4.5 cm and 6 cm;
a second sheet having a thickness of approximately 0.5 mm, the second sheet comprising:
a third lateral edge;
a fourth lateral edge opposite the third lateral edge, a third distance between the third lateral edge and the fourth lateral edge is between 8 cm and 9 cm;
a second top edge; and
a second bottom edge opposite the second top edge, a fourth distance between the second top edge and the second bottom edge is between 4.5 cm and 6 cm; and
a first sealed chamber formed between the first sheet that is affixed to the second sheet, wherein the first sealed chamber includes a transparent portion to provide visual access to the content therein; and
a second sealed chamber formed between the first sheet that is affixed to the second sheet, wherein:
the affixed first sheet and second sheet define a volume to store between 0.001 fluid ounces (fl. oz) and 0.1 fl. oz of the olive oil;
a combined thickness of the first sheet and the second sheet is approximately 1 millimeter(mm);
a combined thickness of the first sheet, the second sheet, and the olive oil is approximately 1.5 mm; and
a combination of a length and a height of the first sheet and the second sheet and the combined thickness of the first sheet, the second sheet, and the olive oil provide a shape configured to fit within a slot that holds a credit card.

6. The container of claim 5, wherein the first sheet is affixed to the second sheet by an adhesive or a sealant, a weld, a pressure or compression seal, or a heat seal.

7. The container of claim 5, wherein the combination of the first sheet, the second sheet, and the olive oil form a substantially flat surface along a top surface of the container and a bottom surface of a container.

8. The container of claim 5, wherein the first sealed chamber is configured to disperse the olive oil approximately evenly within the first sealed chamber to form a substantially flat surface along a top surface of the container and a bottom surface of the container.

9. A container, comprising:
olive oil;
a first lamina; and
a second lamina affixed to the first lamina along a periphery, wherein the periphery comprises a first lateral edge, a second lateral edge opposite the first lateral edge, a top edge, and a bottom edge opposite the top edge, wherein the second lamina affixed to the first lamina form:
a first sealed compartment comprising the olive oil;
a second sealed compartment laterally aligned with the first sealed compartment, wherein the second sealed compartment comprises the olive oil;
a third sealed compartment longitudinally aligned with the first sealed compartment, wherein the third sealed compartment comprises the olive oil;
a fourth sealed compartment laterally aligned with the third sealed compartment and longitudinal aligned with the second sealed compartment, wherein the fourth sealed compartment comprises the olive oil;
a first tear notch disposed on the first lateral edge;
a second tear notch disposed on the second lateral edge and opposite the first notch, wherein a first straight line extends from the first notch to the second notch extends through the first sealed compartment and the second sealed compartment;
a third tear notch disposed on the first lateral edge;
a fourth tear notch disposed on the second lateral edge and opposite the third tear notch, wherein a second straight line extending from the third tear notch to the fourth tear notch extends through the third sealed compartment and the fourth sealed compartment;
a fifth tear notch disposed on the top edge;
a sixth tear notch disposed on the bottom edge and opposite the fifth tear notch, wherein a third straight line extending from the fifth tear notch to the sixth tear notch extends through the first sealed compartment and the third sealed compartment;
a seventh tear notch disposed on the top edge; and
an eighth tear notch disposed on the bottom edge and opposite the seventh tear notch, wherein a fourth straight line extending from the seventh tear notch to the eighth tear notch extends through the second sealed compartment and the fourth sealed compartment.

10. The container of claim 9, wherein the container is shaped to fit within the slot in a wallet, purse, smartphone case, planner, binder, first aid kit, or a money clip that accommodates a business card or a credit card.

11. The container of claim 9, wherein the first lamina is substantially rectangular and the second lamina is substantially rectangular and the first lamina and the second lamina are a same size.

12. The container of claim 9, wherein a combined thickness of the first lamina, the second lamina, and the olive oil relative to a width and length of the combination of the first lamina, the second lamina, and the compartment is such that a force required to break a seal between the first lamina and the second lamina is increased.

13. The container of claim 9, wherein a combined thickness of the first lamina, the second lamina, and the olive oil relative to a width and length of the combination of the first lamina, the second lamina, and the compartment is such that a force required to burst a hole in the first lamina or the second lamina is increased.

\* \* \* \* \*